United States Patent [19]
Huenniger et al.

[11] Patent Number: 5,417,078
[45] Date of Patent: May 23, 1995

[54] REFRIGERATOR FLOW CONTROL APPARATUS

[75] Inventors: Edward A. Huenniger, Liverpool; George M. Case, Kirkville, both of N.Y.

[73] Assignee: Carrier Corporation, Syracuse, N.Y.

[21] Appl. No.: 258,884

[22] Filed: Jun. 13, 1994

[51] Int. Cl.$^6$ ............................................. F25B 41/04
[52] U.S. Cl. ........................................ 62/218; 62/498; 137/397
[58] Field of Search ................. 62/218, 216, 190, 498, 62/DIG. 17; 137/397, 398, 349, 545.15

[56] References Cited

U.S. PATENT DOCUMENTS

| | | | |
|---|---|---|---|
| 1,746,184 | 2/1930 | Bernat | 62/218 X |
| 2,212,600 | 8/1940 | Harm | 137/543.15 X |
| 3,315,482 | 4/1967 | Kirtland et al. | 62/218 X |
| 5,009,079 | 4/1991 | Zinsmeyer | 62/218 |
| 5,285,653 | 2/1994 | Meloling et al. | 62/218 |

Primary Examiner—William E. Wayner

[57] ABSTRACT

A refrigerant flow control system for regulating the flow of a refrigerant liquid from a condenser sump to an evaporator wherein the control system regulates the liquid flow as a function of both the level of the liquid in the condenser sump and the system pressure differential between the condenser and evaporator of the refrigeration system. The flow control system includes a stop, biasing means, a guidepost, a standpipe, a generally tubular metering sleeve, and a float member.

10 Claims, 4 Drawing Sheets

REFRIGERATOR FLOW CONTROL APPARATUS

BACKGROUND OF THE INVENTION

1. Field of the Invention

This invention relates generally to refrigeration and air conditioning systems, and is more particularly directed to a flow control apparatus for regulating the flow of refrigerant between the condenser and the evaporator of a refrigeration system.

2. Description of the Background Art

Generally, large commercial air conditioning systems include a chiller which consists of an evaporator, a compressor, and a condenser and a throttling device. Usually, a heat transfer fluid is circulated through heat transfer tubing in the evaporator to transfer heat from the heat transfer fluid to refrigerant in the evaporator. The heat transfer fluid chilled in the evaporator tubing is normally water or glycol, which is circulated to a remote location to satisfy a cooling load. The refrigerant in the evaporator evaporates as it absorbs heat from the heat transfer fluid, and the compressor operates to extract and compress this refrigerant vapor, and to discharge the compressed vapor to the condenser. In the condenser, the refrigerant vapor is condensed and the liquid refrigerant is delivered back to the evaporator through the throttling device, where the refrigeration cycle begins again.

Lubrication systems for providing oil to the bearings and rotors in the compressor are typically included in the air conditioning systems. Commonly, the oil exits the compressor with the discharge refrigerant to an oil separator which is typically disposed between the compressor and the condenser. After the oil is separated from the refrigerant by the separator, the refrigerant is passed to the condenser and the oil is returned to the compressor.

In certain refrigeration systems no mechanical oil pump is used to supply the necessary oil pressure to the compressor. Consequently, the compressor relies upon the system differential pressure between the condenser and evaporator to pump the oil to the rotors and bearings. As a minimum amount of oil pressure is required to supply sufficient quantities of oil for lubrication and cooling, there may be operating conditions imposed on the machine where the system pressure differential is not large enough to supply an adequate oil flow. Since the system pressure differential is set by the temperature difference between the condenser water and the evaporator water, insufficient oil pressure results when these temperatures approach each other. This situation commonly occurs during a system start-up. However, this situation may also occur at other steady state operating conditions.

Additionally, as condensed refrigerant flows to a lower sump portion of the condenser it must be metered out the evaporator. A flow control unit is needed which ensures that only condensed refrigerant liquid, as opposed to refrigerant vapor, passes to the evaporator. In other words, the control unit should maintain a liquid seal during operation of the system to improve system efficiency.

One approach to this is described in U.S. Pat. No. 5,285,653 granted to Steven E. Meloling, et. al., Feb. 15, 1994. In that patent, the control apparatus includes a standpipe that extends upwardly from an outlet of a condenser sump, with a number of vertical openings spaced about the cylindrical wall of the standpipe near its lower end. A cylindrical metering sleeve is disposed within the cylindrical standpipe.

A ring-shaped float is fitted over the standpipe and attached to the cylindrical metering sleeve so as to close off the standpipe openings when the level of the refrigerant liquid is below a minimum level. As the refrigerant level rises, the float rises with it, and causes the cylindrical metering sleeve to uncover the openings. This allows more refrigerant to flow through to subsequent stages. However, this arrangement does not provide a satisfactory solution to the abovementioned pressure differential problem.

It is desirable to have a refrigerant control apparatus which increases efficiency by both providing an artificially imposed pressure differential between the condenser and the evaporator and by ensuring that only condensed refrigerant liquid passes to the evaporator.

SUMMARY OF THE INVENTION

It is an object of the present invention to provide improved regulation of the refrigerant flow between the condenser and evaporator in response to a low system pressure differential.

It is a further object of the present invention to provide, in a system where the oil pressure is a function of the systempressure differential, an artificially imposed system pressure differential which is larger than would otherwise normally exist during the periods when insufficient oil pressure is developed.

It is another object of the present invention to provide an improved regulation of the refrigerant flow between the condenser and evaporator by throttling and metering the fluid flow between the condenser and the evaporator such that an artificially imposed pressure differential is created between the condenser and the evaporator while providing that only condensed refrigerant liquid passes to the evaporator.

These and other objects of the present invention are achieved by a refrigerant flow control system for regulating the flow of a refrigerant liquid from a condenser sump to a subsequent stage in a refrigeration system wherein the control system regulates the liquid flow as a function of both the level of the liquid in the condenser sump and the system pressure differential between the condenser and evaporator of the refrigeration system. The flow control system includes a stop member, biasing means, a guidepost, a standpipe, a generally tubular metering sleeve, and a float member.

The stop member is disposed in a sump outlet for throttling fluid and has portions which form an axial bore extending therethrough and an upper lip. The biasing means is disposed in the sump outlet for biasing the stop member. The guidepost is attached to the sump outlet floor and is disposed in the axial bore of the stop member for guiding the stop member between lower and upper axial positions. The standpipe is disposed in the condenser sump wherein the standpipe has a tubular wall, an open lower end connected to the condenser sump floor, a closed upper end, and at least one metering slot extending axially on the standpipe through the tubular wall for facilitating fluid flow from the condenser sump toward the stop member. The generally tubular metering sleeve is slidable disposed within the standpipe and axially displaceable over a limited distance therewithin. The float member is slidably disposed on the standpipe and floats on the refrigerant liquid in the condenser sump. The float member includes means for coupling the float member through the tubular wall of the standpipe to the metering sleeve so as to allow the metering sleeve to move as a function of the position of the float member.

The refrigerant pressure in the condenser, under normal operating conditions, is sufficiently higher than that of the evaporator so as to provide adequate oil pressure. As the liquid refrigerant collects at the bottom of the condenser sump, the float member rises which in turn causes the metering sleeve to rise. As the metering sleeve rises the metering slots are uncovered which allows the fluid to flow therethrough. The fluid moves through a sump aperture and applies pressure to the stop member. When the fluid applies sufficient pressure to overcome the force applied by the biasing means, the stop member is caused to move toward the lower axial position, thereby facilitating fluid flow through the sump outlet to the evaporator. Since under normal conditions there is sufficient pressure in the condenser, the stop member is caused to move toward the lower axial position and the refrigerant fluid continues to flow through the sump outlet to the evaporator.

If there is insufficient pressure from the condenser, then the stop member moves toward the upper axial position so that the fluid flow to the sump outlet is obstructed. As a result, the refrigerant accumulates in the condenser and cause the float member to rise. As the condenser floods, the effectiveness of the heat transfer surface of the condenser tubes is reduced. This in turn results in an increase in condenser pressure. Simultaneously, the evaporator is provided with insufficient quantities of liquid refrigerant, and some of the heat transfer surface of the evaporator tubes is dried out. This reduces the effectiveness of the heat exchange surface of the evaporator tubes, and results in a decrease in evaporator refrigerant pressure. The simultaneous increase of condensing pressure and reduction of evaporator pressure results in sufficient oil pressure being restored. After sufficient oil pressure is restored, the stop member moves towards the lower axial position, and the machine returns to normal operation.

The foregoing and other objects, features and advantages of the present invention will become more apparent in light of the following detailed description and accompanying drawings.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts, and wherein;

DETAILED DESCRIPTION OF THE PREFERRED EMBODIMENT

Figure 1:
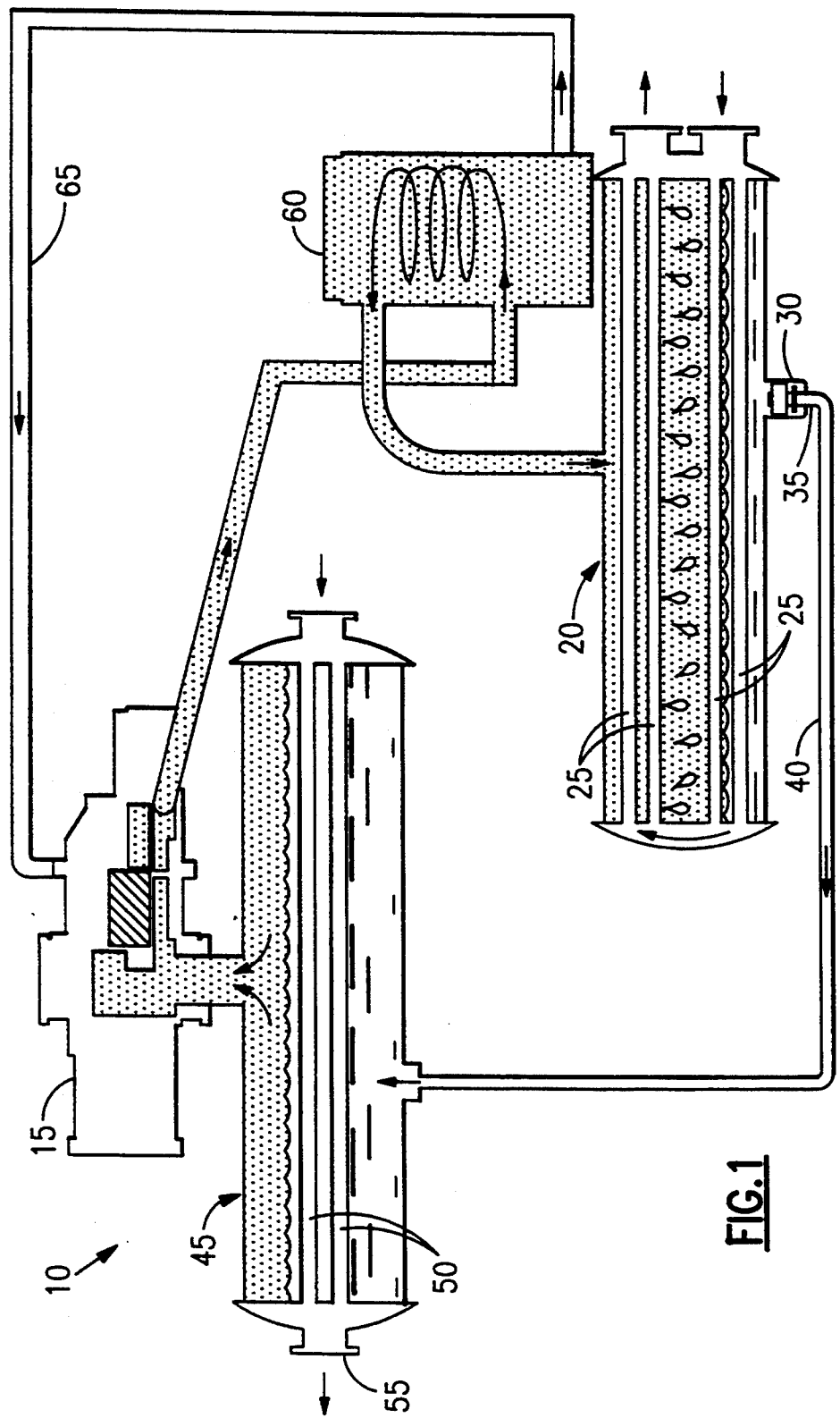
FIG. 1 is an schematic diagram of a chiller system that incorporates the fluid control apparatus of one embodiment of the present invention.

Referring now to FIG. 1, a screw compression refrigeration system 10 is illustrated with a screw compressor 15 supplying compressed refrigerant gas to a condenser 20, where heat is exchanged between the refrigerant vapor and water which is carried in the condenser tubes 25. The refrigerant condenses on these tubes 25 whereby it descends and collects in a condenser sump 30. The condenser sump 30 has a sump outlet 35, where a conduit 40 conveys the condensed refrigerant liquid to an evaporator 45, where the refrigerant evaporates. The expanding vapors absorb heat away from water flowing through the evaporator tubes 50, and the water flows out through a cold water outlet 55, and is, for example, distributed therefrom throughout a building for space cooling.

The compressor 15 then operates to extract the refrigerant vapor from the evaporator 45, to compress this refrigerant vapor, and to discharge the compressed vapor to the oil separator 60. The oil separator 60 separates the oil from the refrigerant vapor and allows the oil to collect at the bottom of the separator 60. If there is a sufficient system pressure differential between the evaporator 45 and the condenser 20 then the oil is driven back to the compressor 15, through a return conduit 65, for lubricating the rotors and bearings of the compressor 15. However, as a minimum amount of oil pressure is required to supply sufficient quantities of oil for lubrication and cooling, an inadequate system differential pressure may cause an insufficient oil flow to the compressor 15. The compressed refrigerant vapor then flows from the oil separator 60 to the condenser 20 where it is condensed and delivered back to the evaporator 45 where the refrigeration cycle begins again.

Figure 2:
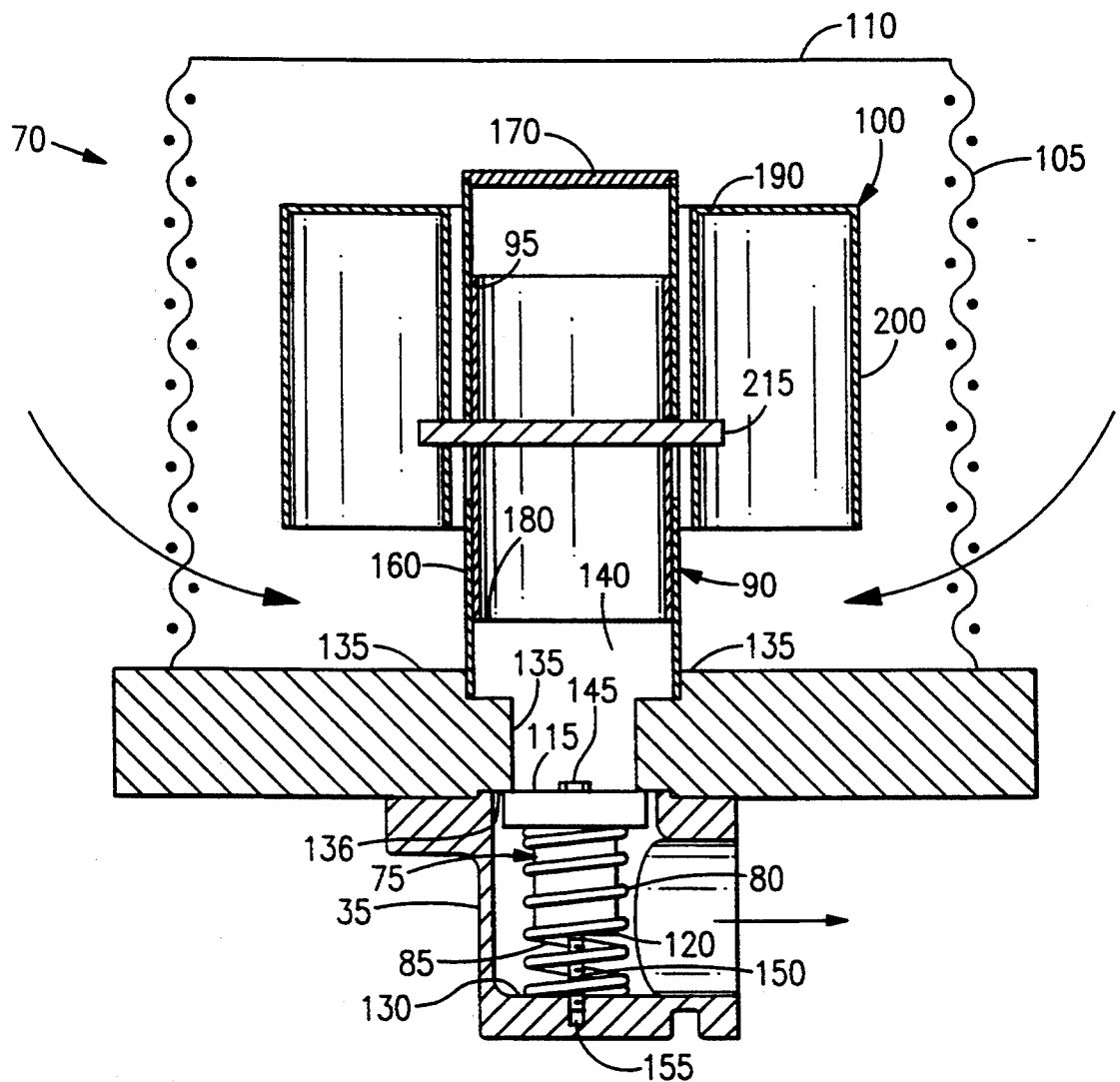
FIG. 2 is an enlargement of a portion of FIG. 1, showing a cross-sectional view of the control apparatus.
Figure 3:
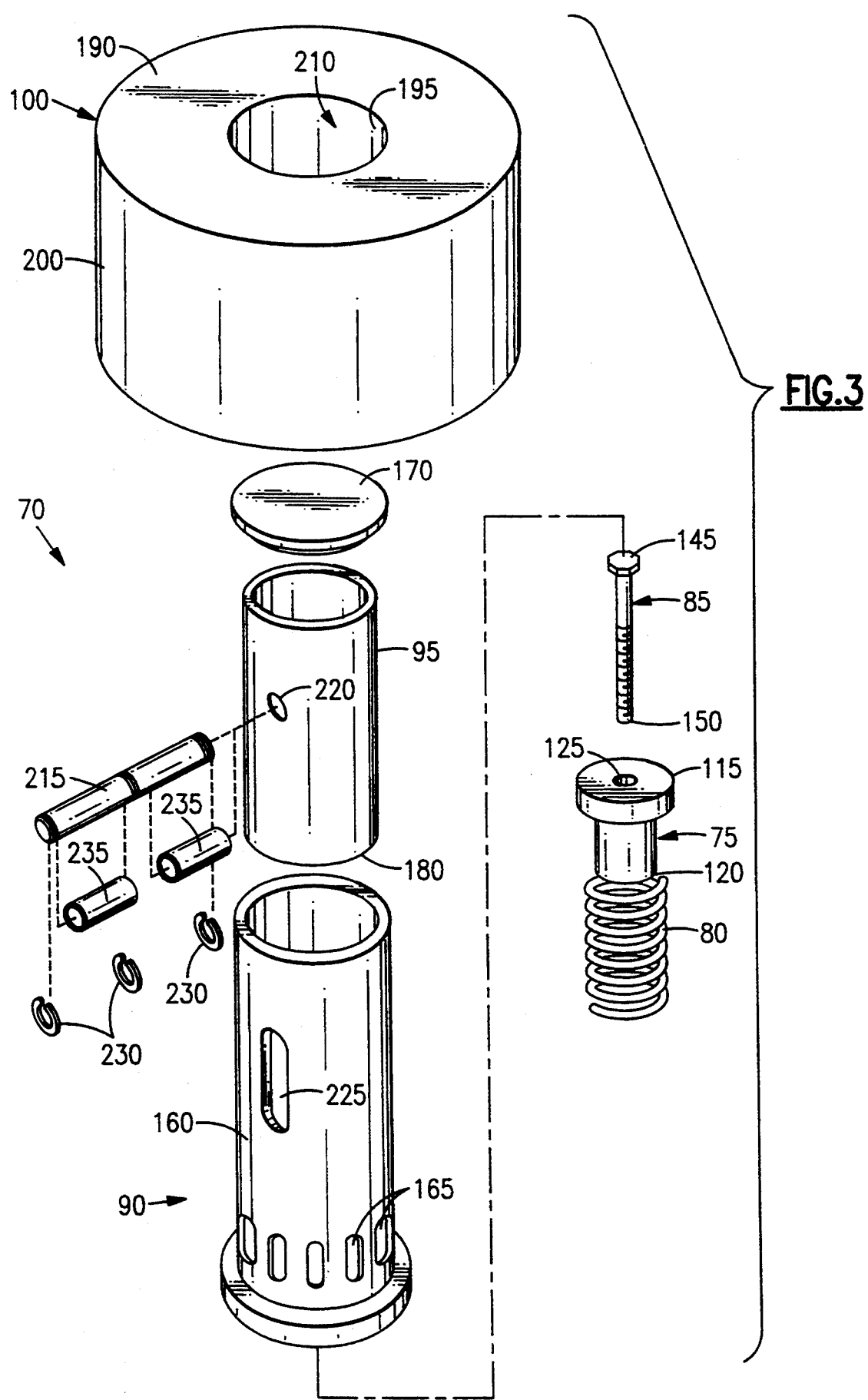
FIG. 3 is an exploded assembly view of the flow control apparatus of a preferred embodiment of the invention.

Referring to FIGS. 2, 3, there is shown a preferred embodiment of the flow control apparatus 70 which includes a stop member 75, a biasing means such as a compression spring 80, a guidepost 85, a standpipe 90, a metering sleeve 95, and a float member 100. A generally cylindrical screen 105 surrounds the standpipe 90 for preventing undesired particles from entering the flow control apparatus 70. Additionally, a roof 110 is disposed overhead above the standpipe 90 for preventing liquid condensate from impacting down directly unto the float member 100.

The stop member 75 itself is in the form of a solid cylindrical metal body having portions which form an upper lip 115, a bottom edge 120, and an axial bore 125 extending therethrough. The stop member 75 is disposed in the sump outlet 35 for throttling fluid flow and is axially displaceable between an upper and lower axial position. The lower axial position is defined as the position where the bottom edge 120 of the stop member 75 forms a confronting relationship with a sump outlet floor 130. The upper axial position is defined as the position where the upper lip 115 of the stop member 75 forms a confronting relationship with a bottom surface 136 of a condenser sump floor 135. FIG. 2 shows the stop member 75 in the upper axial position.

The upper lip 115 is an enlarged cylindrical portion of the stop member 75 having a larger diameter than that of other portions of the stop member 75. The upper lip 115 is preferably circular in shape. However, as one skilled in the art will readily recognize, the upper lip 115 may be any shape so long as its surface area is sufficient to effectively obstruct the fluid flow from the condenser sump 30 to a subsequent stage such as the evaporator 45. The surface area of the upper lip 115 is designed to form a confronting relationship with the condenser sump floor 135 such that the a sump aperture 140 in the condenser sump floor 135 is effectively sealed by the upper lip 115 when the stop member 75 is in the upper axial position. The axial bore 125 is a cylindrical cavity which extends the length of the stop member 75 for receiving the guidepost 85 therein.

The guidepost 85 is disposed in the sump outlet 35 for vertically guiding the stop member 75 between the lower and upper axial positions. The guidepost 85 has a cylindrical metal body with a first and second end 145, 150 wherein the first end 145 has an extended portion with a diameter larger than the diameter of the axial bore 125 of the stop member 75. The remaining portions of the guidepost 85 have a smaller diameter as compared to that of the axial bore 125. The second end 150 is adapted to be screw-threaded into a female receiving bore 155 in the sump outlet floor 130 for attaching the second end 150 to the sump outlet floor 130. A metal bolt, for example, may be used as the guidepost 85.

The biasing means 80 is disposed in the sump outlet 35 such that it forms a confronting relationship with the sump outlet floor 130 and the upper lip 115 for biasing the stop member 75 toward the sump aperture 140. A coiled compression spring disposed coaxially with the stop member 75 may be used as the biasing means 80. If the fluid flow emanating from the sump aperture 140 applies a force to the stop member 75 which is smaller than the force generated by the biasing means 80, the stop member 75 remains in the upper axial position. If the force exerted by the fluid flow is sufficient to overcome the force produced by the biasing means 80 then the stop member 75 moves away from the upper axial position.

A standpipe 90 is vertically disposed in the condenser sump 30 above the sump aperture 140. The standpipe 90 has a tubular wall 160, an open lower end connected to the condenser sump floor 135 on the opposite side of the stop member 75, a closed upper end, and at least one metering slot 165 extending axially on the standpipe 90 through the tubular wall 160 for feeding fluid flow from the condenser sump 30 toward the stop member 75. A cap 170 closes off the top end of the standpipe 90. Situated adjacent the lower end of the standpipe 90 are several axially elongated metering slots 165, which penetrate the standpipe 90 and are preferably evenly spaced around the base of the standpipe 90.

A tubular metering sleeve 95, formed of a cylindrical tube that is open at its upper and lower ends, is slidable disposed within the standpipe 90. The tubular metering sleeve 95 is axially displaceable over a limited distance within the standpipe 90 and has a lower edge 180. The position of the lower edge 180 of the metering sleeve 95 determines the volume of fluid flow through the metering slots 165.

A float member 100 which floats on the refrigerant liquid in the condenser sump 30 is slidably disposed on the standpipe 90. In one preferred embodiment, the float 100 is in the form of a hollow annular shell that is closed except at the bottom. The float 100 itself is in the form of a metal shell, preferably of aluminum, with a flat annual disk 190 serving as a top wall, an inner cylinder 195 and an outer cylinder 200 coaxial therewith, and these cylinders 195, 200 are brazed, welded or formed at their upper edges to the disk 190. The shell has an open bottom, where the surface of the saturated refrigerant liquid condensate closes off the shell to define an inner space within the shell. The inner cylinder 195 forms a cylindrical passage or bore 210 which slidably receives the tubular wall 160 of the standpipe 90. These two cylindrical surfaces are formed at close tolerances. This type of float member is disclosed in U.S patent application No. 5,285,653 granted to Steven E. Meloling, et. al., Feb. 15, 1994, assigned to assignee of the present invention. As described in that patent, the float 100 may be kept filled with the vapor of the refrigerant. One skilled in the art should readily recognize that other float member designs may be used in the present invention to achieve substantially the same desired result.

A float shaft 215 extends transversely through openings 220 in the inner wall of the float 100 and also through the metering sleeve 95, so that the float 100 and metering sleeve 95 travel together up and down relative to the standpipe 90. Axially elongated slots 225 are provided on diametrically opposite sides of the cylindrical wall 160 of the standpipe 90. The float shaft 215 passes through these slots 225. The float 100, shaft 215 and sleeve 95 are permitted a limited amount of up and down travel with respect to the standpipe 90. This construction, with the sleeve 95 symmetrically disposed about the openings 220, facilitates assembly, as the sleeve 95 can be installed into the standpipe 90 with either end up. A retaining spring 230 is situated at the center of the shaft 215, and a pair of tubular spacers 235 are fitted over the shaft 215. Additional retaining springs 230 are positioned on ends of the shaft 215 outside the float inner cylinder 195. This construction keeps the metering sleeve 95 centered within the standpipe 90. Neither the outer surface of the sleeve 95 nor the bore 210 of the float 100 contact the walls of the standpipe 90, as the spacers 235, springs 230 and shaft 215 maintain a small clearance between the float bore 210 and the standpipe 90 and between the sleeve 95 and the standpipe 90.

The stop member 75, biasing means 80, guidepost 85, standpipe 90, float 100, and metering sleeve 95 are formed of relatively inexpensive sturdy materials, which both reduce the manufacturing cost and increase reliability.

The present invention cooperates to regulate the fluid flow from the condenser sump 30 to a subsequent stage, such as the evaporator 45, as follows. The refrigerant pressure in the condenser 20, under normal operating conditions, is sufficiently higher than that of the evaporator 45 so as to provide adequate oil pressure. As the liquid refrigerant collects at the bottom of the condenser sump 30, the float member 100 rises which in turn causes the metering sleeve 95 to rise. As the metering sleeve 95 rises the metering slots 165 are uncovered which allows the fluid to flow therethrough. The fluid moves through the sump aperture 140 and applies pressure to the stop member 75. When the fluid applies sufficient pressure to overcome the force applied by the biasing means 80, the stop member 75 is caused to move toward the lower axial position thereby facilitating fluid flow through the sump outlet 35 to the evaporator 45. Since under normal conditions there is sufficient pressure in the condenser 20, the stop member 75 is caused to move toward the lower axial position and the refrigerant fluid continues to flow through the sump outlet 35 to the evaporator 45.

If there is insufficient pressure from the condenser 20, then the stop member 75 moves toward the upper axial position so that the fluid flow to the sump outlet 35 is obstructed. As a result, the refrigerant accumulates in the condenser 20 and cause the float member 100 to rise, but no refrigerant flows through the openings 165 because the stop member 75 prevents flow through the aperture 140. As the condenser 20 floods, the effectiveness of the heat transfer surface of the condenser tubes 25 is reduced.

This in turn results in an increase in condenser pressure. Simultaneously, the evaporator 45 is provided with insufficient quantities of liquid refrigerant, and some of the heat transfer surface of the evaporator tubes 50 is dried out. This reduces the effectiveness of the heat exchange surface of the evaporator tubes 50, and results in a decrease in evaporator refrigerant pressure. The simultaneous increase of condensing pressure and reduction of evaporator pressure results in sufficient oil pressure being restored. After sufficient oil pressure is restored, the stop member 75 moves towards the lower axial position, and the refrigeration system 10 returns to normal operation.

Thus, by working in conjunction with the stop member 75, the float member 100 allows the flow control apparatus 70 to provide a liquid seal. For example, as the stop member 75 moves from a closed position, i.e., the upper axial position, to an open position, i.e., the lower axial position, the fluid level in the condenser sump 30 lowers, which in turn causes the float member 100 to lower. The float member 100 causes the metering sleeve 95 to cover the metering slots 165 if the liquid level drops below a designated level. As a result, the float member 100 provides a liquid seal by only allowing condensed refrigerant liquid to pass to the evaporator 45 while the stop member 75 provides the proper pressure adjustments for the refrigeration system 10. The liquid seal is also maintained when the stop member 75 moves toward the upper axial position.

Figure 4:
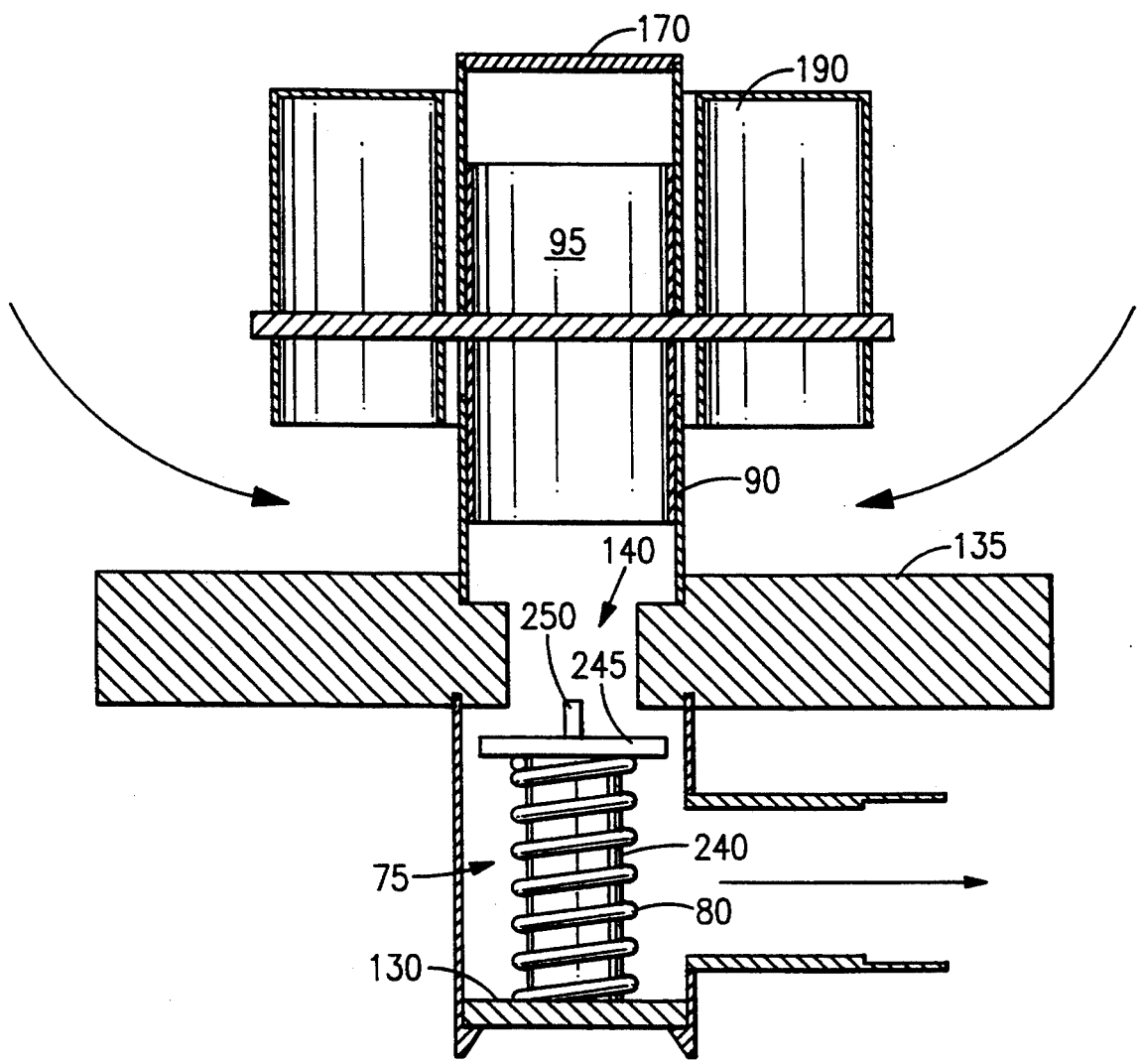
FIG. 4 is another refrigerant flow control apparatus with a modified stop member.

Referring now to FIG. 4, a modified embodiment of the stop member 75 is shown. Rather than a single piece member as shown in FIGS. 2 and 3, the stop member 75 includes a stationary post 240 and a movable disk 245. The stationary post 240 is securely attached to the sump outlet floor 130 at its one end, and has integrally extending from its other end a guidepost 250 which extends upwardly into the sump aperture 140. The movable disk 245 has a hole in its center for slidably receiving the guidepost 250 therein. The spring 80 surrounding the post 240 is disposed between the sump outlet floor 130 and the movable disk 245. When there is no differential pressure in the system, the spring 80 biases the movable disk 245 upwardly on the guidepost 250 so as to engage the lower side of the sump floor 135 to thereby close off any flow. As the pressure differential increases, the force of the spring 80 is overcome so as to move the movable disk 245 downwardly on the guidepost 250. When the differential pressure rises sufficiently to force the movable disk downwardly against the stationary post 240, the aperture 140 is fully open as shown in FIG. 4.

While the present invention has been described with particular reference to a preferred embodiment, the concepts of this invention are readily adaptable to other embodiments, and persons of skill in this art may vary the structure thereof without departing from the true scope and spirit of the present invention, as defined in the claims.

What is claimed is:

1. A refrigerant flow control apparatus for regulating the flow of a refrigerant liquid from a condenser sump to an evaporator; the flow control system comprising:

a standpipe vertically disposed in the condenser sump and having a tubular wall with at least one metering slot extending axially on said standpipe through the tubular wall for facilitating fluid flow from the condenser sump to a sump outlet;

a generally tubular metering sleeve slidably disposed within said standpipe and displaceable between the extreme axial positions wherein said sleeve respectively covers and uncovers said at least one metering slot;

a float member that is slidably disposed on said standpipe and adapted to float on the refrigerant liquid in the condenser sump, said float member including means for coupling said float member through the tubular wall of said standpipe to the metering sleeve to raise or lower said metering sleeve as a function of the vertical position of the float member along said standpipe wherein said metering sleeve meters the liquid flow through the at least one metering slot;

a stop member disposed in said sump outlet for throttling fluid flow through a sump outlet aperture, said stop member having the differential pressure between the condenser and the evaporator acting thereon and being responsively, displaceable axially between closed and open axial positions to respectively close or open said sump outlet aperture;

biasing means disposed in the sump outlet for biasing said stop member toward the closed axial position but allowing said stop member to move toward the open position as the differential pressure is increased; whereby the control system regulates the liquid flow as a function of both the level of the liquid in the condenser sump and the system pressure differential between the condenser and evaporator; and a guidepost attached to a sump outlet floor and disposed in the axial bore of said stop member for guiding said stop member between the closed and open axial positions, wherein when said stop member is in the closed axial position said stop member forms a confronting relationship with said sump outlet aperture for substantially obstructing the fluid flow from the condenser sump to the evaporator.

2. An apparatus as recited in claim 1 wherein said stop member has a surface area larger than said sump outlet aperture so that as the stop member moves to its closed axial position the stop member effectively obstructs all fluid flow from the sump aperture.

3. An apparatus as recited in claim 1 wherein said stop member further includes a lower edge and said sump outlet includes a floor, and further wherein, when said stop member is in the open axial position said lower edge forms a confronting relationship with the sump outlet floor.

4. An apparatus as recited in claim 1 wherein said biasing means comprises a compression spring.

5. An apparatus as recited in claim 1 wherein said stop member includes a disc slidably disposed on a guide post and biased toward a closed position.

6. An apparatus as recited in claim 1 wherein said guidepost comprises a bolt.

7. An apparatus as recited in claim 1 wherein there are a plurality of said metering slots evenly distributed around said standpipe wall.

8. An apparatus as recited in claim 1 wherein said float member includes an inner cylinder slidably disposed over said standpipe; an outer cylinder coaxial with the inner cylinder, and an upper annular plate united with the inner and outer cylinders at their upper edges.

9. An apparatus as recited in claim 7 wherein a float shaft passes transversely through diametrically opposed openings in said metering sleeve, though corresponding slots in said standpipe wall, and through diametrically opposed openings in the inner cylindrical wall of said float member.

10. An apparatus as recited in claim 9 wherein said metering sleeve has open top and bottom ends, and said openings into which the float shaft is fitted are disposed midway between the top and bottom ends.

* * * * *